US005526971A

United States Patent [19]
Despain

[11] Patent Number: 5,526,971
[45] Date of Patent: Jun. 18, 1996

[54] BICYCLE RACK

[76] Inventor: Stephen S. Despain, 1171 E. 300 N., Orem, Utah 84057

[21] Appl. No.: 239,418

[22] Filed: May 6, 1994

[51] Int. Cl.⁶ .................................................. B60R 9/00
[52] U.S. Cl. ........................... 224/519; 224/532; 224/924
[58] Field of Search ................ 224/42.03 B, 42.45 R, 224/924, 488, 492, 502, 506, 532, 519

[56]  References Cited

U.S. PATENT DOCUMENTS

| | | | |
|---|---|---|---|
| 3,225,986 | 12/1965 | Anderson | 224/924 |
| 3,891,132 | 6/1975 | Chandler | 224/924 |
| 3,921,869 | 11/1975 | Rogers | 224/42.03 B |
| 4,084,736 | 4/1978 | Jacobs, Jr. | 224/492 X |
| 4,413,761 | 11/1983 | Angel | 224/512 X |
| 4,875,608 | 10/1989 | Graber | 224/924 |
| 4,934,572 | 6/1990 | Bowman et al. | 224/42.03 B |
| 4,938,399 | 7/1990 | Hull et al. | 224/42.45 R X |
| 5,065,921 | 11/1991 | Mobley | 224/42.03 B X |
| 5,269,446 | 12/1993 | Biehn | 224/42.03 B |
| 5,373,978 | 12/1994 | Buttchen et al. | 224/42.03 B X |

FOREIGN PATENT DOCUMENTS

| | | | |
|---|---|---|---|
| 3526243 | 2/1987 | Germany | 224/42.03 B |
| 1271776 | 11/1986 | U.S.S.R. | 224/42.03 B |

*Primary Examiner*—Renee S. Luebke
*Attorney, Agent, or Firm*—A. John Pate; Gary D. E. Pierce; Berne S. Broadbent

[57] ABSTRACT

A bicycle carrier is attachable to a hitch receiver secured to the rear end of a vehicle. A trunnion insertable into the receiver may extend rearwardly (with respect to the vehicle) to support an upright connected at a lower end to the trunnion. A lower arm may extend from the trunnion to be substantially parallel thereto, or even co-linearly therewith to support a tray positioned to extend substantially horizontally and laterally (substantially at a right angle to the lower arm). The upright, may support a top arm extending rearwardly away from the vehicle from a top end of the upright. A fork mount may be attached to extend laterally on each side of the top arm to extend away from the top arm in the same direction as the tray extends from the lower arm. A bicycle may be supported on a rear wheel in the tray, secured by the tines of a front fork to the fork mount, after removal of the front wheel. A second bicycle may be mounted in mirror-image fashion opposite the first bicycle. The front wheels removed from the bicycles may each be supported by a yoke comprising two parallel bars or straps of metal, each connected at one end to the upright to extend laterally away to another end connecting to one end of the axle of the front wheel. The lower arm and top arm may be extended to attach more pairs of bicycles to the carrier.

19 Claims, 3 Drawing Sheets

BICYCLE RACK

BACKGROUND

1. The Field of the Invention

This invention relates to hitch-mounted devices for holding bicycles on the back of a vehicle, and more particularly, to novel systems and methods for a device for holding multiple bicycles on the back of a vehicle with minimal extension therebehind.

2. The Background Art

Many bicycle racks hold only two bicycles. In addition, some racks extend too far behind the carrying vehicle. Some racks, when loaded, protrude more than three feet, the legal limit in some states. Many racks prevent access to the back of the carrying vehicle, such as for opening a door or trunk, without removal of the rack. Racks may lack means to lock bicycles in a way that they may be easily removed. Furthermore, many racks require purchase and installation of special hitch apparatus for mounting a rack.

BRIEF SUMMARY AND OBJECTS OF THE INVENTION

In view of the foregoing, it is a primary object of the present invention to resolve these problems.

It is another object of the invention to provide a device easily attachable to a hitch of a vehicle.

It is another object of the invention to provide a device easily loaded with bicycles.

It is another object of the invention to provide a device that does not exceed the legal extension limit when loaded with two or four bicycles.

It is another object of the invention to provide a device sufficiently elevated to preclude contact with the ground when passing through a ditch or equivalent.

It is another object of the invention to provide a device that may be lowered to provide access to the rear of the vehicle.

It is another object of the invention to provide a device adaptable to carry up to six bicycles at once.

Consistent with the foregoing objects, and in accordance with the invention as embodied and broadly described herein, a bicycle rack is disclosed in one embodiment of the present invention as including a hitch-mounted device for holding a plurality of bicycles at the rear of a vehicle, while still remaining within legal extension limits for the vehicle.

The device or apparatus may include a first member or post extending substantially vertically, having attached substantially perpendicularly thereto a second member or trunnion to fit a hitch on the vehicle. The trunnion may extend rearwardly to form or otherwise connect to a lower arm. The lower arm may extend away from the hitch to connect to a third member or tray extending substantially horizontally, and substantially perpendicularly with respect to the lower arm. The tray may be adapted to hold the rear wheel of a bicycle. The lower arm may be extendible away from the hitch for carrying additional bicycles in a similar manner.

At a top end of the post, and substantially perpendicularly with respect thereto, a fourth member or top arm may extend substantially horizontally away to support a box-like structure or block. The top arm and block form a fork mount. The block may have slots formed therein adapted to hold one end of the front fork of a bicycle attached to the apparatus.

Two pairs of metal arms extend from opposite sides of the post to form a yoke. Each pair of arms connects to the post to extend away therefrom, being adapted to support the two sides of a front wheel removed from a bicycle. The arms are moveable (pivotable as illustrated) with respect to the post, having means for securing (such as quick-release axle locks as illustrated) the wheels to one end of a pair of the arms. An attachment structure for securing the front fork to the fork mount, and for securing the front wheel to the yoke (pair of arms) may be provided for each bicycle.

In use, an apparatus in accord with the invention may be employed by removing a front wheel from a first bicycle to be loaded, placing the front wheel between the pair of arms in the yoke, and securing the axle at the center of the wheel to the ends of each arm of the pair of arms forming the yoke.

The rear wheel may be then placed on the tray, the front fork being secured to the sides of the fork mount on the top arm. The process may be repeated for a second bicycle positionable opposite the first bicycle to extend away therefrom in a mirror-image fashion illustrated.

Adding more bicycles may be accomplished by extending the apparatus. For example, a user may add an extension to the lower arm for holding the rear wheels and so forth, to position additional bicycles away from the vehicle in a fashion similar to that of the first two bicycles as described above. The apparatus may be extended to hold up to 3 pairs of bicycles and may be adapted to hold more bicycles.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 3, is not intended to limit the scope of the invention, as claimed, but it is merely representative of presently preferred embodiments of the invention.

The presently preferred embodiments of the invention will be best understood by reference to the drawings, wherein like parts are designated by like numerals throughout.

Figure 1:
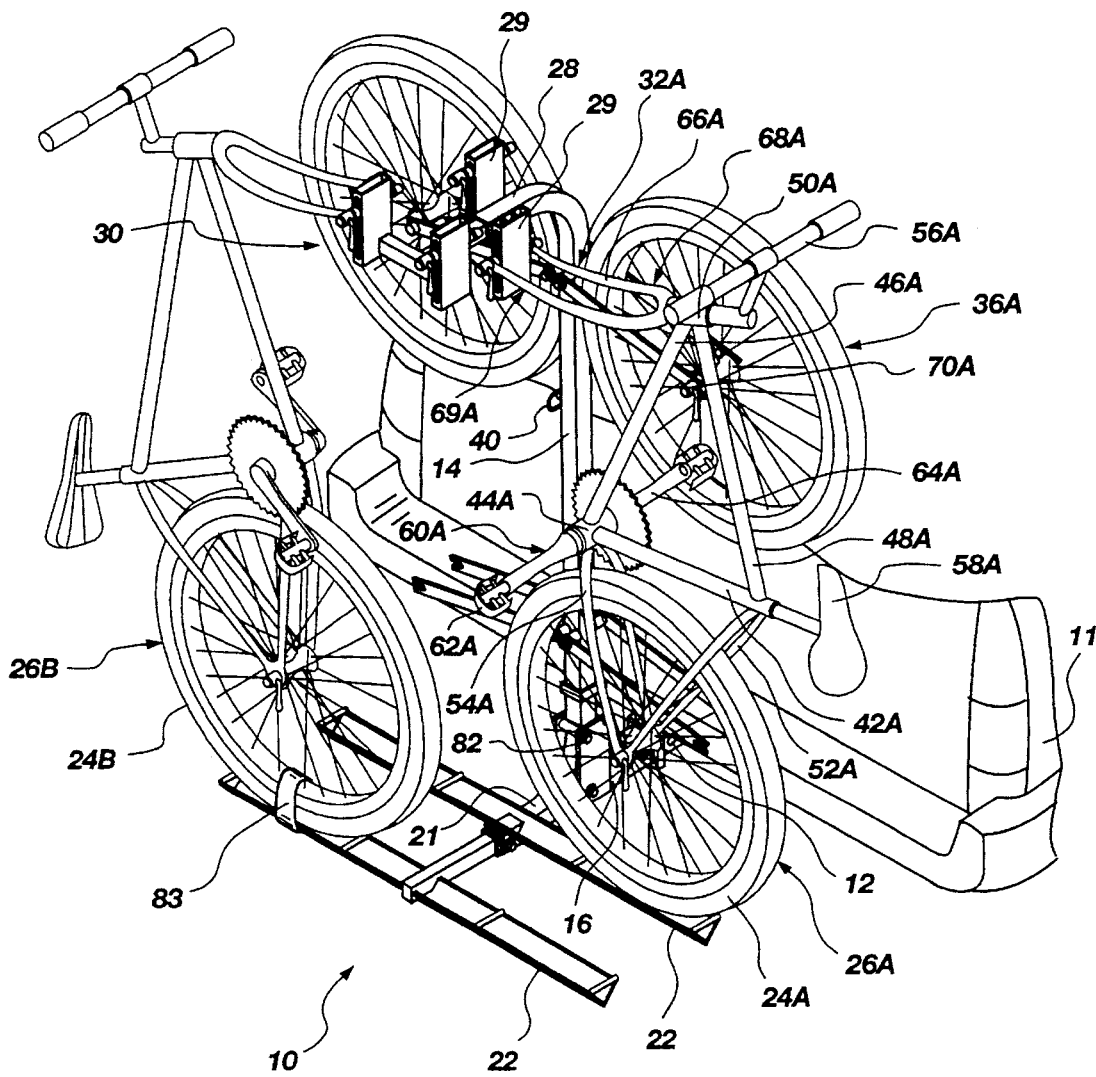
FIG. 1 is a rear isometric view (with respect to a mounting vehicle) of an apparatus made according to the invention for holding bicycles on a vehicle, illustrated with two bicycles thereon having their front wheels removed and supported by the apparatus.
Figure 2:
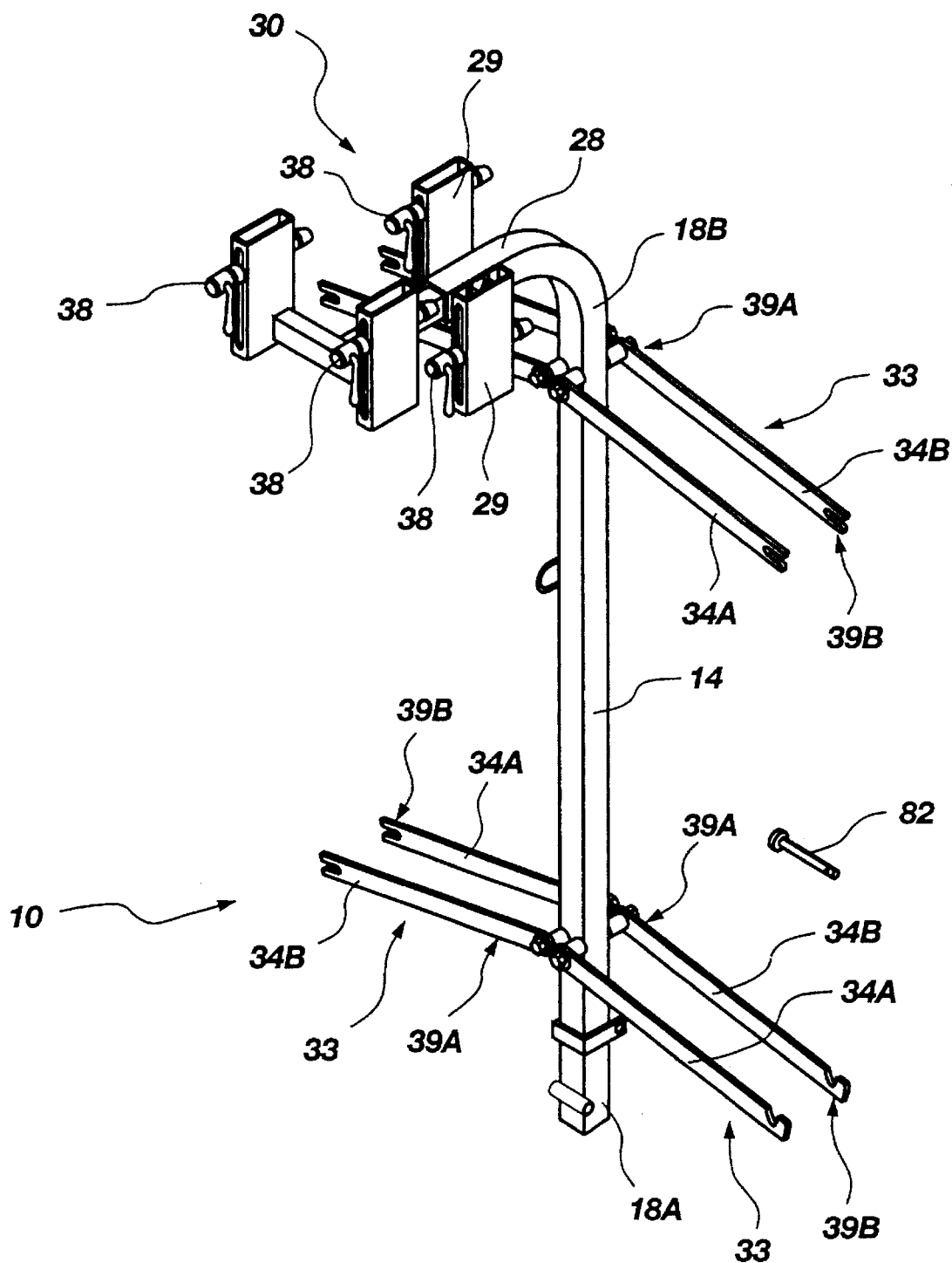
FIG. 2 is a rear isometric view of the apparatus of FIG. 1 with the bicycles removed.
Figure 3:
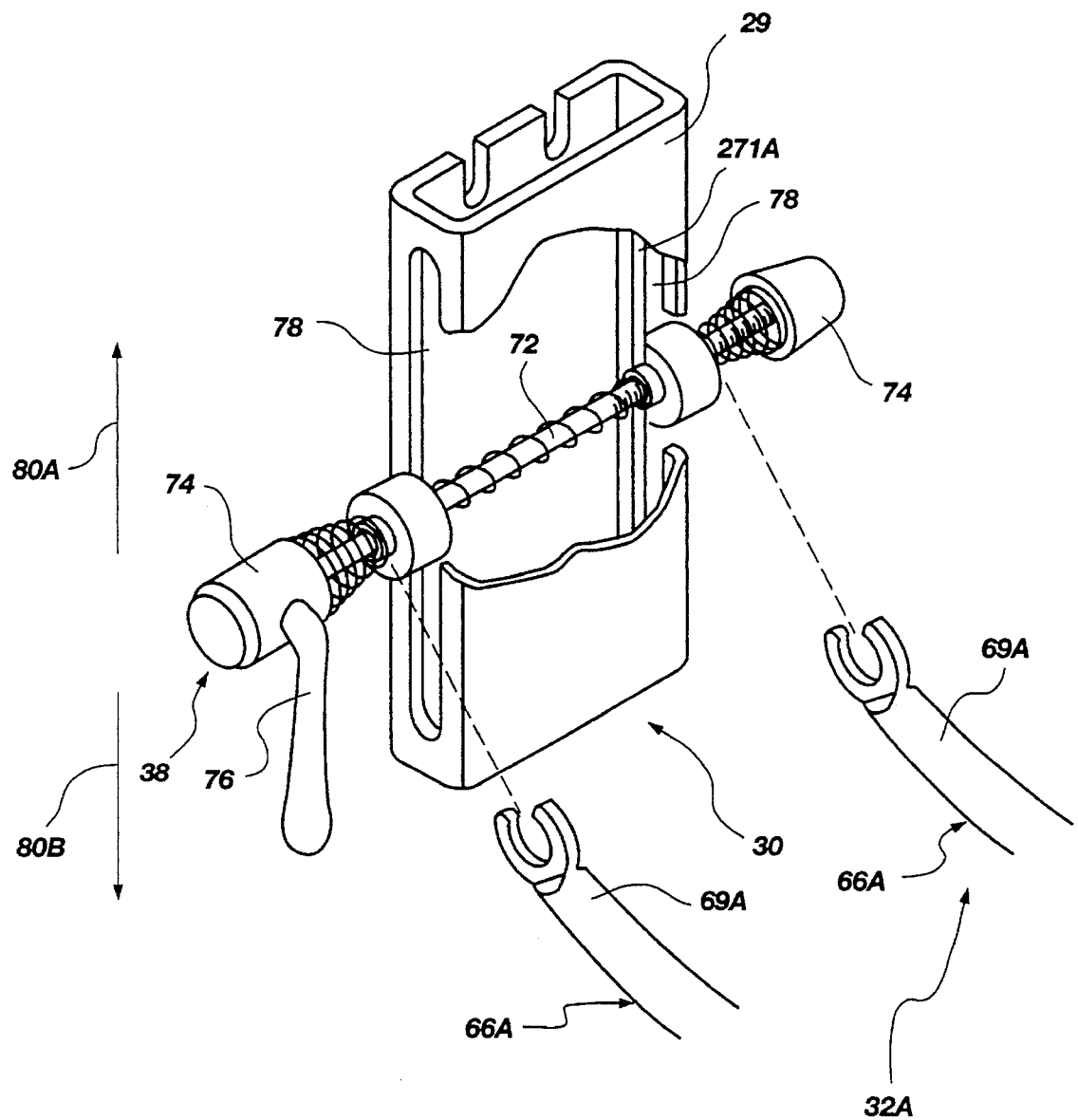
FIG. 3 is a rear isometric view of the fork mount and a quick release skewer, a type of locking device for securing a fork of a bicycle to the fork mount, of the apparatus of FIG. 1.

In FIGS. 1–3, an apparatus 10, for attachment to a receiver 12, also referred to as a hitch mount 12, of a vehicle 11, may include a post 14 connectable to the receiver 12 by a trunnion 16. The post 14 extends upwardly from a first or lower end 18A, connected to the trunnion 16, to a second or upper end 18B. One end, a front end, of the trunnion 16 may be secured to the hitch mount 12, while the other end, back end, may be adapted to supportively connect to the post 14. A lower arm 21 may extend from the trunnion 16 or post 14 to support a tray 22. The apparatus 10 may be extended, such as by extending the lower arm 21, for holding additional bicycles (not shown) oriented as the bicycles 26A, 26B.

A tray 22 may be secured to the lower arm 21 connected to the trunnion 16 to extend horizontally away for supporting the rear wheels 24A, 24B of bicycles 26A, 26B thereon. A top arm 28 may extend away from the top end 18B of the post 14 for supporting blocks 29 for receiving the front fork 32A of the bicycle 26A. Alternatively, terms such as "support" or "fork mount" and the like may be used to indicate the entire fork mount 30, the assembly including the top arm 28 and blocks 29 adapted to provide support of a front fork 32A of a bicycle 26A by the post 14.

A yoke 33 may comprise arms 34A, 34B extending away from the post 14 for supporting the front wheel 36A of the bicycle 26A. A skewer assembly 38 replaces the front wheel 36A in the fork 32A for securing the front wheel 36A to the block 29 of the fork mount 30. The arms 34A, 34B may be pivotably attached proximate the end 39A of the yoke 33 to move with respect to the post 14, thus facilitating the front wheel 36A resting against the post for support. The arms 34A, 34B may be secured at one end 39A to the post 14 by fasteners such as bolts. The axle 70A of the front wheel 36A may serve as a bolt to secure the wheel 36A between the arms 34A, 34B at an end 39B opposite the post 14.

A lock loop 40 may be attached to the post 14 for receiving a lock, cable or the like. The chain or cable may then be threaded through the bicycle 26A at a convenient location, such as near the intersection of the down tube 46A and the seat tube 42A, and firmly locked. Once locked the cable or chain may prevent accidental release of a bicycle 26A during transit, or unauthorized, intentional removal by theft.

In general, a bicycle 26A includes a seat tube 42A, crank housing 44A, down tube 46A top tube 48A, head tube 50A, seat stays 52A, chain stays 54A, with handlebars 56A, and a seat 58A. A crank assembly 60A includes pedals 62A and cranks 64A rotatable with respect to the crank housing 44A.

Rotatably secured in the head tube 50A may be a front fork 32A connected to be turned by the handlebars 56A. The fork 32A has tines 66A connected at the head end 68A of the fork 32A, separated at an axle end 69A, and adapted to receive an axle 70A of the front wheel 36A.

The axle 70A may be removed from the tines 66A with the front wheel 36A. When the rear wheel 24A of the bicycle 26A may be set into the tray 22, the head tube 50A with the tines 66A are pivoted, about the rear wheel 24A, toward the fork mount 30.

The block 29 of the fork mount 30 may be fastened, such as by bolting, to the upper arm 28. In securing the bicycle 26A to the apparatus 10, the axle 70A may be replaced through the tines 66A by a skewer assembly 38 having a skewer 72 to fit through the slots 74 to extend across the block 29. The skewer 72 may be one of many types known in the art. The quick-release type shown may be one suitable type of skewer 72 having adjustment nuts 74 and a quick-release lever 76 for applying and releasing tension on the skewer 72. When tension is released, the skewer may be selectively moved upwardly 80A and downwardly 80B along the slots 78 to adjust for the size of the bicycle 26A extending from the tray 22 to the fork mount 30.

The post 14 may be secured to the trunnion 16 to be pivotable or tiltable away from the vehicle 11. A pin 82 may be removed from securing the post 14 in an upright position to permit tilting of the post 14. The post 14 may be tilted away from the vehicle 11 toward a position lying down with respect to an upright position. Thus, a user may open a door or otherwise gain access to the rear of the vehicle 11 without unloading the bicycles 26A, 26B or removing the apparatus 10.

In one embodiment, the trunnion 16 and lower arm 21 may have a combined length of from about 18 inches to about 2 feet as desireable and necessary to support the total number of bicycles 26A, 26B to be carried. The upper arm 28 may extend from about 7 to about 10 inches from the post 14 as desireable and necessary to fit the bicycles 26A, 26B properly. The lower arm 21 and upper arm 28 may be extended, as discussed above. The apparatus may accommodate additional bicycles 26A up to six in one presently preferred embodiment. More bicycles 26A are possible in an apparatus 10 made in accordance with the invention, however.

The tray 22 may be from about 3 feet to about 6 feet long, and may be 'V'-shaped. The tray 22 may also be provided with clamps 83 placed to secure the rear wheel 24A in place in the tray 22. The arms 34A, 34B may be sized to hold the front wheel 36A, but may conveniently be sized from about 1 foot to about 2 feet long.

In one embodiment, a stand may be provided to replace the receiver 12, for supporting and stabilizing the apparatus 10 on a surface. Thus, the apparatus 10 is adaptable to serve as a compact storage device for bicycles 26A when not in use for transit.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for carrying a bicycle having a seat tube and a fork, the apparatus being attachable to a receiver attached to a vehicle having a lateral direction substantially perpendicular to a rearward direction and an upward direction, the apparatus comprising:

a trunnion securable to the receiver to extend rearwardly away;

a post connected proximate one end thereof to the trunnion to extend upwardly to another end;

a first support attached to the post proximate the one end and adaptable to support the bicycle with the seat tube extending substantially laterally away from the post; and a second support attached proximate the other end of the post for selectively securing the bicycle to the apparatus.

2. The apparatus of claim 1 further comprising an extension adapted for attachment to the first support for extending the first support to support additional bicycles.

3. The apparatus of claim 1 wherein the first support comprises an arm extending rearwardly away from the post for supporting the bicycle.

4. The apparatus of claim 1 wherein the first support further comprises a tray for supporting a wheel of the bicycle.

5. The apparatus of claim 1 wherein the first support further comprises a plurality of trays for supporting bicycles thereon.

6. The apparatus of claim 1 wherein the second support comprises an arm extending rearwardly away from the post for receiving and supporting the fork of the bicycle.

7. The apparatus of claim 1 wherein the second support comprises a block, with a skewer selectively positionable along the block for receiving tines of a fork of the bicycle.

8. The apparatus of claim 1 further comprising a yoke attached to the post and adapted to receive an axle of a wheel of the bicycle for supporting the wheel.

9. The apparatus of claim 1 wherein the first support and second support further comprise means for securing a plurality of bicycles in pairs, each bicycle of a pair being oriented in a mirror image position with respect to the other bicycle in the pair.

10. The apparatus of claim 1 further comprising an extension attachable to extend rearwardly away from the post for supporting a plurality of bicycles spaced from the post.

11. The apparatus of claim 1 further comprising a mechanism to selectively position the post away from the vehicle.

12. The apparatus of claim 11 wherein the mechanism further comprises a pin selectively insertable and removable to lock and release, respectively, the post.

13. An apparatus for carrying a bicycle on a vehicle having a longitudinal direction, a lateral direction, and an upward direction, substantially orthogonal to one another, the bicycle having a fork and a seat tube and the apparatus comprising:

a base attached to the vehicle to extend longitudinally away;

a post secured proximate one end thereof to the base to extend upwardly to another end;

a first support attached to the post proximate the one end for selectively supporting the bicycle on the apparatus; and a second support attached proximate the other end of the post and being adaptable to support the bicycle oriented with the fork extending substantially laterally away from the second support.

14. The apparatus of claim 13 wherein the first support comprises an arm extending longitudinally away from the post for supporting the bicycle and the second support comprises an arm extending longitudinally away from the post for receiving and supporting the fork.

15. The apparatus of claim 13 further comprising a yoke attached to the post and adapted to receive an axle of a wheel of the bicycle for supporting the wheel.

16. The apparatus of claim 13 wherein the post is adapted to be selectively positionable away from the vehicle.

17. The apparatus of claim 13 wherein the first support and second support further comprise means for securing a plurality of bicycles in pairs, each bicycle of a pair being oriented to extend laterally in a mirror image position with respect to the other bicycle in the pair, the length of each bicycle extending upwardly.

18. The apparatus of claim 13 wherein the first support further comprises a tray for supporting a wheel of the bicycle.

19. The apparatus of claim 18 wherein the first support further comprises a plurality of trays.

* * * * *

UNITED STATES PATENT AND TRADEMARK OFFICE
CERTIFICATE OF CORRECTION

PATENT NO. : 5,526,971
DATED : June 18, 1996
INVENTOR(S) : Steven S. Despain

It is certified that error appears in the above-indentified patent and that said Letters Patent is hereby corrected as shown below:

Title page, item [76], iventor: delete "Stephen", and insert --Steven--.

Column 3, line 44, after "tube 46A" insert --,--.

Signed and Sealed this

Twenty-sixth Day of November 1996

Attest:

BRUCE LEHMAN

*Attesting Officer*     *Commissioner of Patents and Trademarks*